(12) United States Patent
Zhao et al.

(10) Patent No.: US 9,106,470 B2
(45) Date of Patent: Aug. 11, 2015

(54) ENHANCED DECODING AND DEMAPPING METHOD AND APPARATUS FOR QAM DATA SIGNALS

(71) Applicant: QUALCOMM Incorporated, San Diego, CA (US)

(72) Inventors: Lu Zhao, Erlangen (DE); Stefan Brueck, Neunkirchen am Brand (DE); Stephan Schlupkothen, Aachen (DE); Muhammad Awais Amin, Nuremberg (DE); Juan Montojo, Nuremberg (DE); Marc W. Werner, Heroldsberg (DE); Hendrik Schoeneich, Heroldsberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/946,706

(22) Filed: Jul. 19, 2013

(65) Prior Publication Data

US 2014/0153672 A1 Jun. 5, 2014

Related U.S. Application Data

(60) Provisional application No. 61/732,877, filed on Dec. 3, 2012.

(51) Int. Cl.
*H03D 1/24* (2006.01)
*H04L 27/06* (2006.01)
*H04L 27/34* (2006.01)
*H04L 1/00* (2006.01)

(52) U.S. Cl.
CPC ............... *H04L 27/06* (2013.01); *H04L 1/005* (2013.01); *H04L 1/0057* (2013.01); *H04L 27/3416* (2013.01); *H04L 1/0036* (2013.01)

(58) Field of Classification Search
CPC ............ H04L 25/067; H04L 25/03318; H04L 27/3045; H04L 27/38; H04L 27/06; H04L 1/006
USPC ...................... 375/320, 240.24, 261, 265, 316
See application file for complete search history.

(56) References Cited

U.S. PATENT DOCUMENTS

| 8,358,685 B2 | 1/2013 | Siti et al. |
| 2003/0039318 A1 | 2/2003 | Tong et al. |

(Continued)

FOREIGN PATENT DOCUMENTS

| WO | 2007012053 A1 | 1/2007 |
| WO | 2011021382 A2 | 2/2011 |

OTHER PUBLICATIONS

International Search Report and Written Opinion—PCT/US2013/068993—ISA/EPO—Feb. 5, 2014.

*Primary Examiner* — Daniel Washburn
*Assistant Examiner* — Fitwi Hailegiorgis
(74) *Attorney, Agent, or Firm* — Mahamedi Paradice LLP (57) ABSTRACT

A receiver circuit, including a multi-stage QAM de-mapper, for receiving a QAM data signal is disclosed. A first de-mapper circuit recovers a set of encoded data bits from the QAM data signal by calculating a plurality of distances between a received QAM symbol and each of a plurality of possible constellation points. A second de-mapper circuit then generates a set of unencoded data bits for the received QAM symbol based, at least in part, on the plurality of distances calculated by the first de-mapper circuit. The receiver circuit may further include a decoder circuit to decode the set of encoded data bits recovered by the first de-mapper circuit. The second de-mapper circuit may identify a subset of the plurality of possible constellation points based on a result of the decoding and select a constellation point that is associated with the shortest distance of the plurality of distances.

29 Claims, 9 Drawing Sheets

(56) References Cited

U.S. PATENT DOCUMENTS

| | | |
|---|---|---|
| 2003/0156659 A1 | 8/2003 | Hanaoka et al. |
| 2006/0274845 A1 | 12/2006 | Chiang et al. |
| 2010/0329393 A1 | 12/2010 | Higuchi |
| 2012/0134423 A1* | 5/2012 | Zhou et al. ............... 375/240.24 |
| 2012/0250805 A1 | 10/2012 | Shin |
| 2012/0300861 A1 | 11/2012 | Shen et al. |

* cited by examiner

ENHANCED DECODING AND DEMAPPING METHOD AND APPARATUS FOR QAM DATA SIGNALS

RELATED APPLICATIONS

This application claims priority to U.S. Provisional Patent Application No. 61/732,877, titled "Enhanced Decoding and Demapping Method and Apparatus for QAM Data Signals," filed Dec. 3, 2012, which is hereby incorporated by reference in its entirety.

TECHNICAL FIELD

The present embodiments relate generally to QAM data signals, and specifically to de-mapping QAM data signals in multiple stages.

BACKGROUND OF RELATED ART

Quadrature amplitude modulation (QAM) is a particular type of modulation scheme that can be used to transmit digital data by modulating a carrier signal. QAM "symbols" are mapped to binary data bits based on the amplitude and phase of the QAM signal received during a particular symbol period. The mapping and de-mapping of QAM symbols is typically performed using a "constellation," wherein each point on the constellation represents both a QAM symbol (e.g., corresponding to a set of amplitude and phase information) and a binary bit pattern (e.g., corresponding to a set of labeling bits). Thus, a constellation may be used to map binary data bits to QAM symbols to be transmitted, as well as to recover (e.g., de-map) binary data from received QAM symbols. For example, an M-QAM constellation may be used to map M number of symbols to M number of bit patterns, wherein each bit pattern includes $L=\log_2(M)$ number of labeling bits.

The data rate of a QAM communications system varies directly with the QAM constellation size. For example, increasing the number of constellation points (M) also increases the number of data bits (L) that can be communicated during a symbol period (e.g., $L=\log_2(M)$). As the constellation becomes more densely populated, the spacing between constellation points (e.g., the "Euclidean distance") becomes smaller. This reduces the margin of error that the system can tolerate when using the constellation to recover data bits from a received QAM signal. Further, because imperfections exist in the transmission channel and in the receiving circuits, the received signal may be distorted (e.g., in shape). This may cause bit errors in the received signal.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A device and method of operation are disclosed that may aid in data recovery for modulated data signals. More specifically, the device may correspond to a receiver circuit for receiving a quadrature amplitude modulation (QAM) data signal. For some embodiments, the receiver circuit may include a first de-mapper circuit to recover a set of encoded data bits from the QAM data signal by calculating a plurality of distances between a received QAM symbol and each of a plurality of possible constellation points; and a second de-mapper circuit to generate a set of un-encoded data bits for the received QAM symbol based, at least in part, on the plurality of distances calculated by the first de-mapper circuit. The device may also include a decoder circuit to decode the set of encoded data bits recovered by the first de-mapper circuit. The second de-mapper circuit may thus identify a subset of the plurality of possible constellation points based on a result of the decoding and select a constellation point that is associated with the shortest distance of the plurality of distances.

For some embodiments, the set of encoded data bits may correspond to a low density parity check (LDPC) code word. The result of the decoding may include a set of information bits and a set of parity bits that represent least significant bits (LSBs) of the received QAM symbol. The second de-mapper circuit may thus identify the subset of possible constellation points by identifying those constellation points that include the LSBs. Accordingly, the set of un-encoded data bits may correspond to the most significant bits (MSBs) of the selected constellation point.

For some embodiments, the second de-mapper circuit may be selectively operable in a first mode or a second mode, wherein: when operating in the first mode, the second de-mapper circuit is configured to recover the set of un-encoded data bits concurrently with the first de-mapper circuit recovering the set of encoded data bits; and when operating in the second mode, the second de-mapper circuit is configured to generate the set of un-encoded data bits after receiving information about the plurality of distances calculated by the first de-mapper circuit. The receiver circuit may also include a noise detector to detect noise in the QAM data signal. The noise detector may be configured to select either the first mode or the second mode of operation based on the detected noise.

Performing data recovery for a received QAM symbol in multiple stages may improve the overall accuracy of the receiver circuit, for example, because any errors in the original estimation of the LSBs of the QAM symbol (e.g., by the first de-mapper circuit) may be corrected by the LDPC decoder. The improved estimation on the LSBs may then be fed back to the second de-mapper. Furthermore, selectively operating the second de-mapper circuit in either the first mode or the second mode (i.e., using the feedback from decoder) may enable the receiver to perform more efficient de-mapping of the QAM signals when the noise level is low and/or to perform more precise de-mapping of the QAM signals when the noise level is high (and thus the tolerable margin of error is low).

BRIEF DESCRIPTION OF THE DRAWINGS

The present embodiments are illustrated by way of example and are not intended to be limited by the figures of the accompanying drawings, where.

DETAILED DESCRIPTION

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
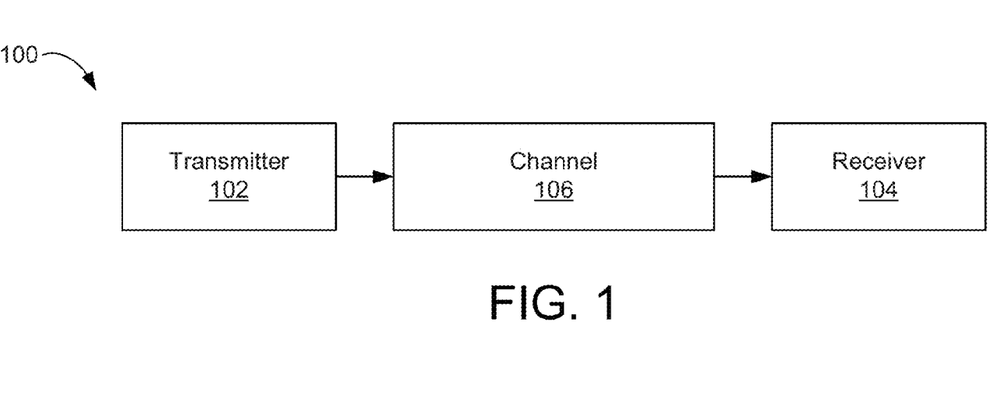
FIG. 1 illustrates a communications system in accordance with some embodiments.

FIG. 1 illustrates a communications system 100 in accordance with some embodiments. System 100 includes a transmitter 102, a receiver 104, and a channel 106. The transmitter 102 transmits a modulated (e.g., QAM) signal onto the channel 106, and the receiver 104 receives the signal from the channel 106. The transmitter 102 and receiver 104 may be, for example, computers, switches, routers, hubs, gateways, and/or similar devices. For some embodiments, the channel 106 may be a wired link (e.g., coaxial cable, fiber-optic line, twisted pair cable, etc.). For example, the communications system 100 may correspond to a cable network, a telephone network, or any type of suitable connection network. For other embodiments, the channel 106 may be wireless.

Imperfection of various components in the communications system 100 may become sources of signal impairment, and thus signal degradation. For example, I/Q mismatch in the transmitter 102 and/or in the receiver 104 may cause signal impairment. Imperfections in the channel 106 may introduce channel distortion, which may include linear distortion, multi-path effects, and/or Additive White Gaussian Noise (AWGN). Carrier frequency offset in receiver 104, which results from the frequency of a local oscillator in receiver 104 differing from the frequency of a corresponding local oscillator in transmitter 102, may cause additional signal impairment.

To combat potential signal degradation, the transmitter 102 and receiver 104 may include data encoders and decoders, respectively. Specifically, the transmitter 102 may encode at least a portion of the outgoing data to produce a codeword that can be subsequently decoded by the receiver 104 to recover the original data (i.e., information bits). Data encoding typically involves adding more data (e.g., parity bits) to the information bits to be transmitted, which effectively reduces the data rate of communications between the transmitter 102 and the receiver 104. Thus, for some embodiments, the transmitter 102 encodes only a subset of the total information bits to be transmitted. The receiver 104 demodulates (e.g., de-maps) a received data signal and decodes the encoded portion of the received data. For some embodiments, the receiver 104 may use feedback from the decoding to verify and/or correct the demodulated data. Accordingly, the receiver 104 may demodulate the received data signal in multiple stages.

Figure 2:
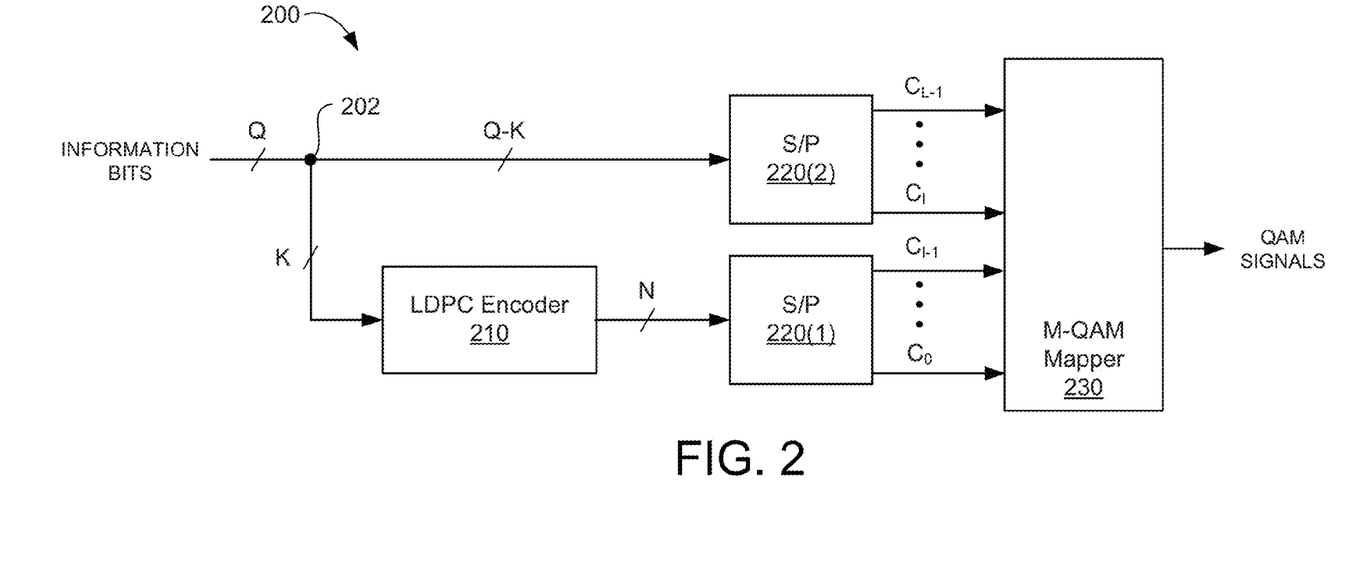
FIG. 2 illustrates a block diagram of a transmitter with multi-stage QAM mapping circuitry in accordance with some embodiments.

FIG. 2 illustrates a block diagram of a transmitter 200 in accordance with some embodiments. Transmitter 200 includes a low-density parity-check (LDPC) encoder 210, a set of serial-to-parallel (S/P) converter modules 220(1)-220(2), and an M-QAM mapper 230. The transmitter 200 is coupled to receive Q information bits to be transmitted (e.g., to a receiving device) and transmits QAM data signals representative of the information bits. Specifically, each QAM data signal may correspond to a QAM symbol which maps to a particular sequence of labeling bits.

The Q information bits are separated by a splitter 202 into two sub-sets of data (i.e., one containing K information bits, and the other containing Q-K information bits). The K information bits are provided to the LDPC encoder 210, which encodes the K information bits into an N-bit codeword (i.e., the LDPC encoder 210 has an encoding rate of K/N). Accordingly, each codeword generated by the LDPC encoder 210 includes the K information bits as well as N-K parity bits which may be used to verify and/or correct the original K information bits when decoded by a receiver (e.g., as described in greater detail below), thereby increasing the robustness of the transmitted data. As discussed above, encoding more information bits effectively reduces the overall data rate of communications. Thus, for some embodiments, the LDPC encoder 210 encodes only the K information bits (of the original Q information bits) which will mapped onto least significant bits (LSBs) of a corresponding QAM constellation. The remaining Q-K information bits (of the original Q information bits), which will mapped onto the most significant bits (MSBs) of the QAM constellation, are left un-encoded.

The S/P modules 220(1) and 220(2) convert the N encoded bits and Q-K un-encoded bits, respectively, from serial to parallel form. Specifically, the first S/P module 220(1) receives the N encoded bits from the LDPC encoder 210, in series, and outputs one or more sets of I labeling bits $C_0$-$C_{I-1}$ in parallel. Similarly, the second S/P module 220(2) receives the Q-K un-encoded bits in series and outputs one or more sets of L-I labeling bits $C_I$-$C_{L-1}$ in parallel.

The M-QAM mapper 230 receives the L labeling bits $C_0$-$C_{L-1}$ from the S/P modules 220(1)-220(2) and maps them to one of M possible QAM symbols of a QAM constellation. For purposes of discussion, M represents the total number of constellation points that are available in a particular QAM constellation, and L represents the number of labeling bits that map to each point on the constellation. Thus, an M-QAM constellation may be used to map M number of QAM symbols to M number of bit patterns, wherein each bit pattern includes $L=\log_2(M)$ number of labeling bits. For example, a 1024-QAM constellation has 1024 constellation points, wherein each point on the constellation maps to a 10-bit value (i.e., $L=\log_2(1024)=10$). The M-QAM mapper 230 outputs a modulated signal (i.e., a QAM signal) that corresponds to the QAM symbol to which the L labeling bits are mapped. For example, M-QAM mapper 230 may modulate the QAM signal such that the amplitude and phase of the modulated signal identifies a particular constellation point on the M-QAM constellation that corresponds to the QAM symbol.

LDPC encoding (and decoding) ensures the accuracy of the LSBs of the Q information bits which, in turn, may be used to ensure the accuracy of the MSBs of the Q information bits (e.g., as described in greater detail below). This becomes more useful as the QAM constellation becomes larger and as the Euclidian distances between constellation points becomes smaller. The relative number of encoded bits (K) versus un-encoded bits (Q-K) may be determined, for example, by balancing resource cost against efficiency of the communications system.

Figure 3:
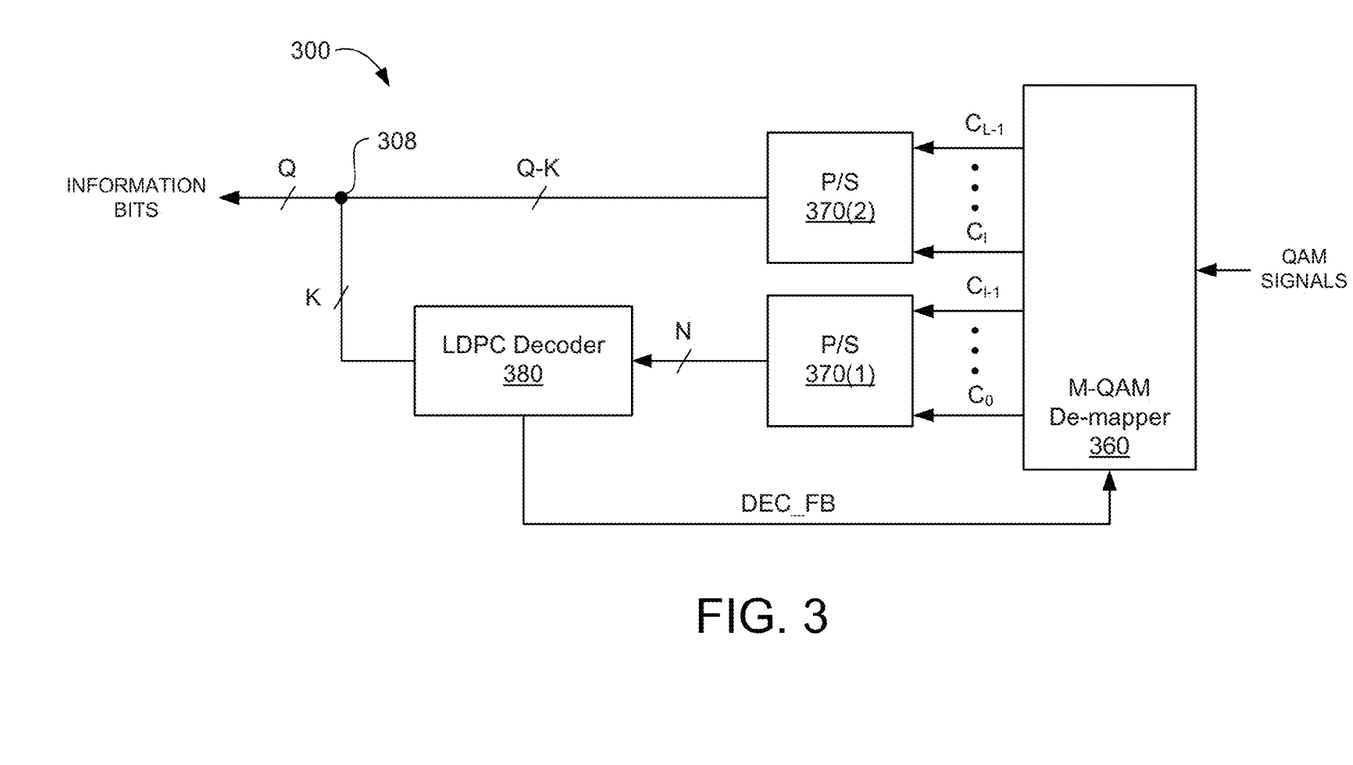
FIG. 3 illustrates a block diagram of a receiver with multi-stage QAM de-mapping circuitry in accordance with some embodiments.

FIG. 3 illustrates a block diagram of a receiver 300 with multi-stage QAM de-mapping circuitry in accordance with some embodiments. The receiver 300 includes M-QAM de-mapper 360, a set of parallel-to-serial (P/S) converter modules 370(1)-370(2), and an LDPC decoder 380. The receiver 300 receives QAM data signals (e.g., from a transmitting device) and recovers the original Q information bits that were mapped to the received QAM data signals. More specifically, the received QAM data signals may represent a QAM symbol that maps to a particular set of labeling bits (i.e., a constellation point) in an M-QAM constellation. Although not shown for simplicity, the receiver 300 may contain other commonly-known components. These components may include, for example, a network interface, one or more processing resources, clock and timing signals, one or more transceivers, and one or more memory sources.

The received QAM data signals are provided to the M-QAM de-mapper 360 which performs a multi-stage de-mapping operation on the received data signals to recover I labeling bits $C_0$-$C_{L-1}$. More specifically, during a first stage of the de-mapping operation, the M-QAM de-mapper 360 may estimate a first subset of the L labeling bits (i.e., labeling bits $C_0$-$C_{I-1}$) of the received QAM symbol based on QAM symbol information from the received QAM signal. For example, the QAM symbol information may include the amplitude and phase of the received QAM signal (e.g., during a predetermined symbol period).

It should be noted that the amplitude and phase of the received QAM signal may be altered or distorted from its original state (e.g., based on noise and/or interference in the transmission medium). However, the M-QAM de-mapper 360 may still be able to estimate the LSBs of the received QAM symbol based on the region of the constellation indicated by the QAM symbol information. Thus, for some embodiments, the first subset of labeling bits $C_0$-$C_{I-1}$ may represent the I least significant bits of the received QAM symbol. Furthermore, the I labeling bits $C_0$-$C_{I-1}$ may correspond to a subset of the original Q information bits that were encoded prior to transmission (e.g., as described above with reference to FIG. 2). Accordingly, the labeling bits $C_0$-$C_{I-1}$ may correspond to an LDPC codeword. The P/S module 370(1) converts one or more sets of I labeling bits $C_0$-$C_{I-1}$ to an N-bit serial bit stream which is subsequently provided to the LDPC decoder 380.

The LDPC decoder 380 performs an LDPC decoding operation on one or more sets of labeling bits $C_0$-$C_{I-1}$ to recover K information bits. For some embodiments, the K information bits may correspond to the LSBs of the original Q information bits. The LDPC decoder 380 may further provide a decoding feedback (DEC_FB) signal to the M-QAM de-mapper 360 based on a result of the decoding operation. More specifically, the DEC_FB signal may include an updated representation of the I labeling bits $C_0$-$C_{I-1}$. For example, LDPC decoding is a process for verifying the validity of the bits in an LDPC codeword (e.g., the I labeling bits $C_0$-$C_{I-1}$) by iteratively performing parity check operations based on an LDPC code (or using an LDPC parity check matrix). Through LDPC decoding, the LDPC decoder 380 may correct bit errors that are found in the labeling bits $C_0$-$C_{I-1}$ based on the LDPC code. As a result of this coding gain, the LDPC decoder 380 may provide a more accurate determination of the I labeling bits $C_0$-$C_{I-1}$ than the M-QAM de-mapper 360. For some embodiments, the DEC_FB signal may indicate updated bit values for the I labeling bits $C_0$-$C_{I-1}$. For other embodiments, the DEC_FB signal may indicate the soft estimate of the I labeling bits (i.e. the probabilities of the bit values for the I labeling bits).

During a second stage of the de-mapping operation, the M-QAM de-mapper 360 may generate the remaining labeling bits $C_I$-$C_{L-1}$ based on the DEC_FB signal. For some embodiments, the M-QAM de-mapper module 360 may use the information from the DEC_FB signal to reduce the QAM constellation size. For example, the M-QAM de-mapper module 360 may filter the QAM constellation to include only the subset of constellation points that map to labeling bits with the updated $C_0$-$C_{I-1}$ bit values as their LSBs. In this manner, the constellation size may be reduced to $M_0=2^{L-N}$. From this subset, the M-QAM de-mapper 360 may select the constellation point that is closest to the received signal.

After a constellation point has been selected, the M-QAM de-mapper 360 may then determine the L labeling bits that map to the selected constellation point and output a subset of the corresponding L labeling bits (i.e., labeling bits $C_I$-$C_{L-1}$) to P/S module 370(2). For some embodiments, the subset of labeling bits $C_I$-$C_{L-1}$ may represent the L-I most significant bits of the L labeling bits. Furthermore, the L-I labeling bits $C_I$-$C_{L-1}$ may correspond to a subset of the original Q information bits that were not encoded prior to transmission (e.g., as described above with reference to FIG. 2). The P/S module 370(2) converts one or more sets of labeling bits $C_I$-$C_{L-1}$ to a serial bit stream comprising Q-K information bits. A combiner 308 combines the Q-K bits output by the P/S module 370(2) with the K bits output by the LDPC decoder 380, in sequence, to reproduce the original Q information bits.

For the present embodiments, recovering information bits from a QAM signal in multiple stages improves the overall accuracy of the receiver 300. In contrast, a conventional QAM de-mapper would attempt to recover all L labeling bits simultaneously. With a conventional de-mapping operation, any errors in the estimation of a constellation point may not be corrected through feedback techniques, and may potentially affect the de-mapping of all L labeling bits. For example, as a QAM constellation grows in density and/or complexity, the margin of error for de-mapping an individual constellation point shrinks. Furthermore, because imperfections exist in the transmission channel and in the receiving circuits, the received QAM signal may be distorted (i.e., the phase and/or amplitude of the received signal may be altered). The receiver 300 may overcome these impairments by estimating a first subset of labeling bits for the received QAM symbol, and then generating the remaining labeling bits for the QAM symbol based on feedback from decoding the first subset of labeling bits and the distances stored in the first de-mapper module.

Figure 4:
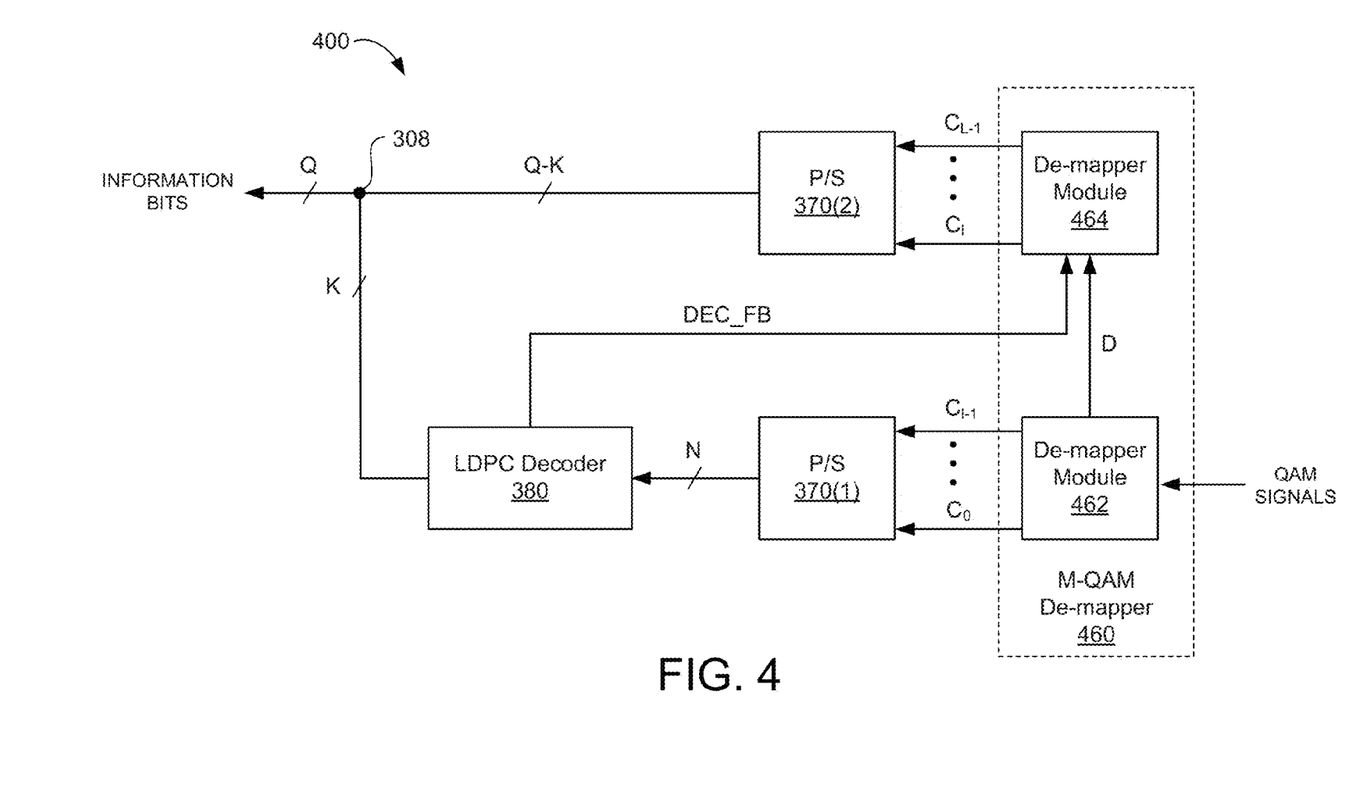
FIG. 4 illustrates a block diagram of a receiver with multi-stage QAM de-mapping circuitry in accordance with other embodiments.

FIG. 4 illustrates a block diagram of a receiver 400 with multi-stage QAM de-mapping circuitry in accordance with other embodiments. Receiver 400 includes M-QAM de-mapper 460, P/S modules 370(1)-370(2), and LDPC decoder 380. The receiver 400 receives QAM data signals and recovers the original Q information bits that were mapped to the received QAM data signals. As described above with reference to FIG. 3, the receiver 400 may process a received QAM signal in multiple stages, using results from LDPC decoder 380 as feedback to improve the overall estimation accuracy.

The M-QAM de-mapper 460 includes a first de-mapper module 462 and a second de-mapper module 464. The first de-mapper module 462 performs a first de-mapping operation on the received QAM signal to recover one or more sets of encoded labeling bits ($C_0$-$C_{I-1}$). As described above, the encoded labeling bits may correspond to a subset (e.g., LSBs) of the original Q information bits that were encoded (e.g., using LDPC encoding techniques) prior to being mapped to a QAM symbol. The first de-mapper module 462 may recover the encoded data bits by first calculating the Euclidean distances (D) between the received QAM symbol (e.g., as defined by the amplitude and phase of the received QAM signal during a predetermined symbol period) and each constellation point on an M-QAM constellation. For some embodiments, the first de-mapper module 462 may provide the distance calculations D to the second de-mapper module 464.

The first de-mapper module 462 may estimate the encoded labeling bits $C_0$-$C_{I-1}$ based on one or more constellation points that are closest to the received QAM symbol. The first de-mapper module 462 then outputs the encoded labeling bits $C_0$-$C_{I-1}$ to P/S module 370(1). The P/S module 370(1) converts one or more sets of encoded labeling bits $C_0$-$C_{I-1}$ to an N-bit serial bit stream which is subsequently provided to the LDPC decoder 380. As described above, the LDPC decoder 380 performs an LDPC decoding operation on the encoded labeling bits $C_0$-$C_{I-1}$ to recover K information bits. The LDPC decoder 380 may further provide a DEC_FB signal to the second de-mapper module 464 based on a result of the decoding operation. For some embodiments, the DEC_FB signal may indicate updated bit values for the encoded labeling bits $C_0$-$C_{I-1}$. For other embodiments, the DEC_FB signal may indicate the accuracy of the de-mapping operation performed by the M-QAM de-mapper 460 (e.g., by specifying how many and/or which of the original $C_0$-$C_{I-1}$ were incorrect).

The second de-mapper module 464 generates the remaining L-I labeling bits ($C_I$-$C_{L-1}$) of the received QAM symbol. As described above, the remaining labeling bits may correspond to a subset of the original Q information bits that were left un-encoded when mapped to a QAM symbol. For some embodiments, the second de-mapper module 464 may generate the L-I labeling bits $C_I$-$C_{L-1}$ based on the DEC_FB signal received from the LDPC decoder 380 and/or the distance values D received from the first de-mapper module 462. For some embodiments, the second de-mapper module 464 may use the DEC_FB signal to reduce the QAM constellation size (e.g., as described above with reference to FIG. 3) and select a constellation point from the subset that is closest to the received QAM symbol (e.g., based on the distance values D). For other embodiments, the second de-mapper module 464 may use the DEC_FB signal as a probabilistic indicator of the likelihood that the distance values D are correct. For example, the second de-mapper module 464 may determine a most probable constellation point based on the distance values D and the accuracy information received via the DEC_FB signal.

After the second de-mapper module 464 has selected a particular constellation point, it may then identify the L labeling bits that map to the selected constellation point and output the subset of L-I labeling bits $C_I$-$C_{L-1}$ to P/S module 370(2).

The P/S module 370(2) converts one or more sets of the $C_I$-$C_{L-1}$ bits to a serial bit stream comprising Q-K information bits. Combiner 308 combines the Q-K bits output by the P/S module 370(2) with the K bits output by the LDPC decoder 380, in sequence, to reproduce the original Q information bits.

It should be noted that, for at least some embodiments, the second de-mapper module 464 does not receive a QAM signal as an input. Accordingly, the second de-mapper module 464 may perform a "de-mapping" operation without using the actual QAM symbol information (e.g., amplitude and phase information). Rather, the second de-mapper module 464 selects a constellation point representative of the received QAM symbol based on the distance values D calculated by the first de-mapper module 462. Moreover, reducing the size of the M-QAM constellation (e.g., to $M_0=2^{L-N}$), based on the DEC_FB signal, enables the second de-mapper module 464 to select the constellation point from a smaller subset of possible constellation points with a higher degree of certainty.

Figure 5A:
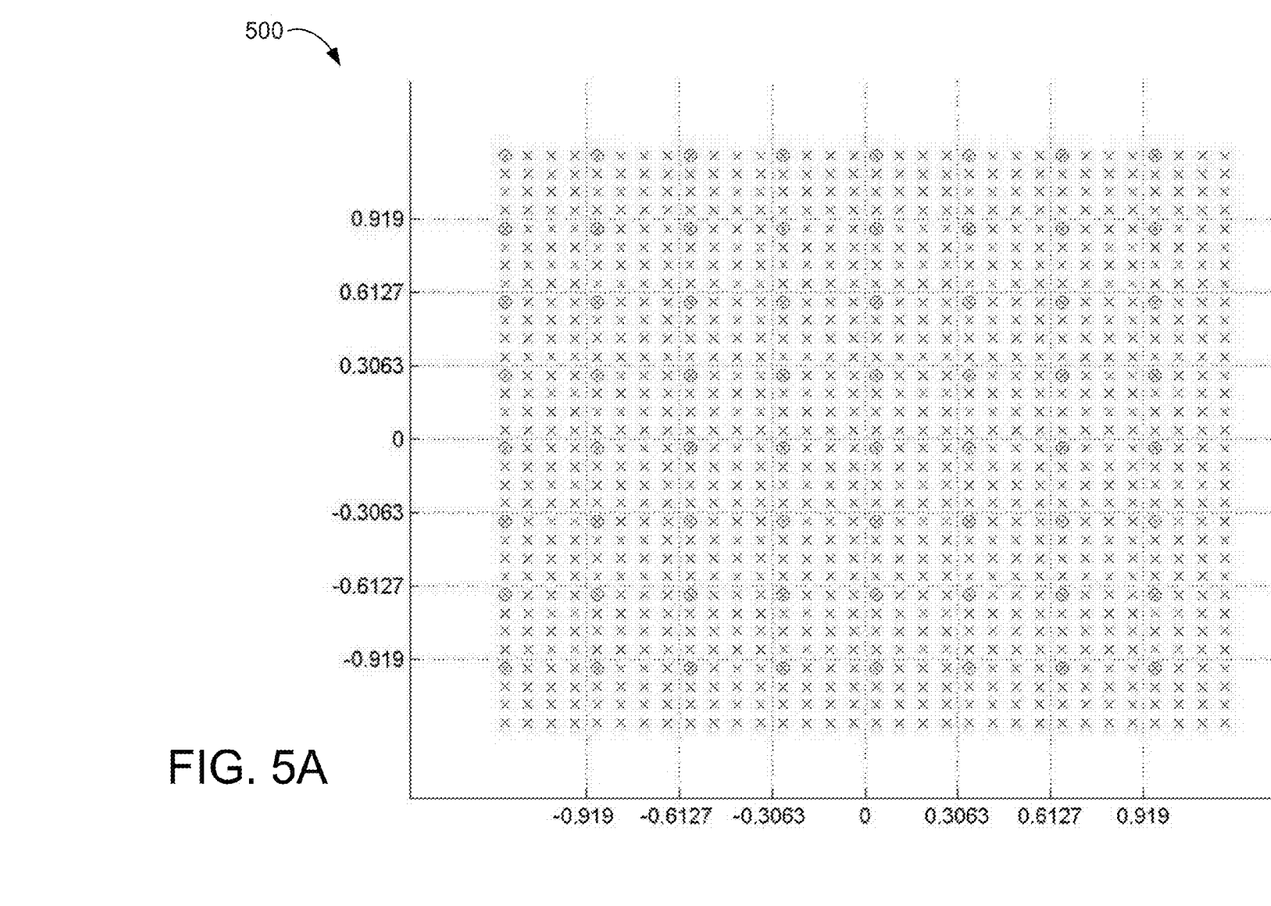
FIGS. 5A-5B illustrate exemplary QAM constellations that may be used for mapping received QAM symbols to labeling bits in accordance with some embodiments.
Figure 5B:
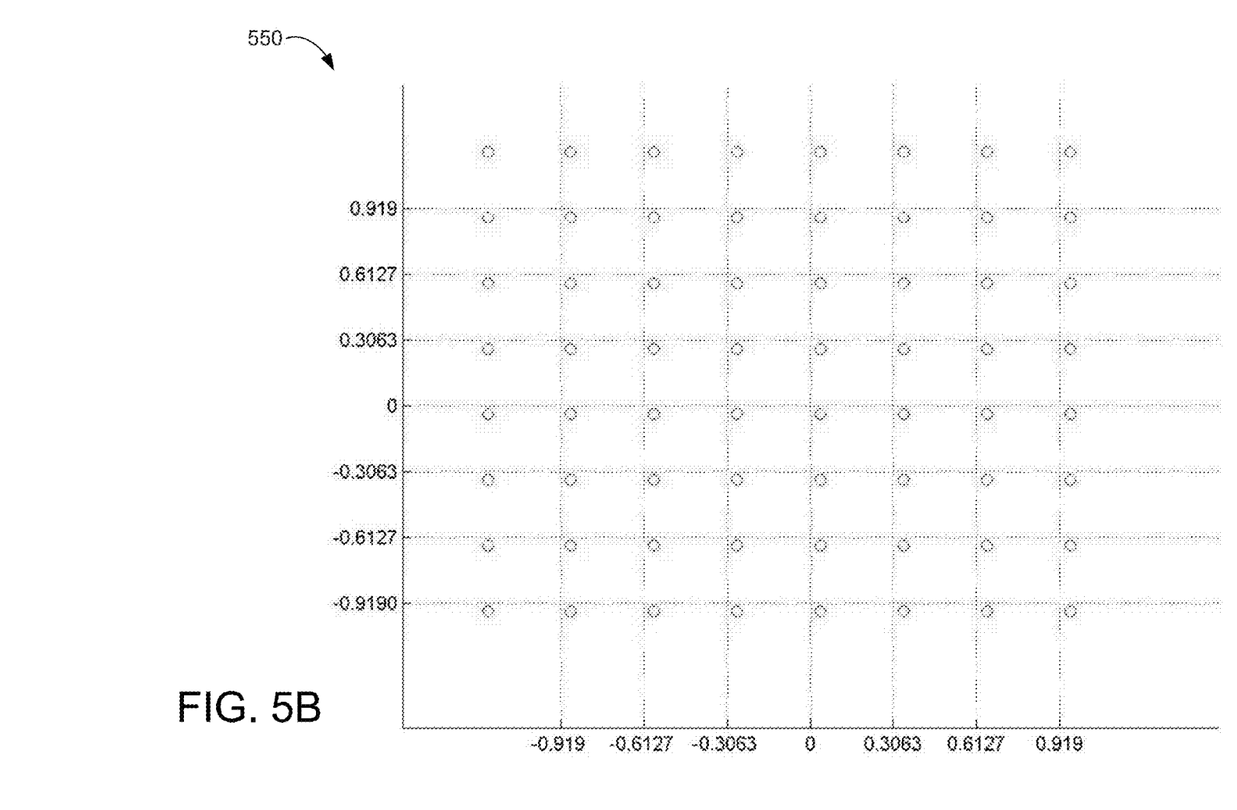

For example, FIG. 5A illustrates an exemplary 1024-QAM constellation 500 wherein each constellation point maps to a pattern of 10 labeling bits, 4 of which are encoded. For some embodiments, the first de-mapper module 462 calculates the distances D between a received QAM symbol and each of the constellation points in the 1024-QAM constellation 500 based on QAM symbol information from a received QAM data signal. In contrast, the second de-mapper module 464 may select an updated constellation point from a smaller subset of possible constellation points such as shown in FIG. 5B. More specifically, the original 1024-QAM constellation 500 has been reduced to the 64-QAM constellation 550 (i.e., $M_0=2^{(10-4)}=64$) shown in FIG. 5B.

Figure 6:
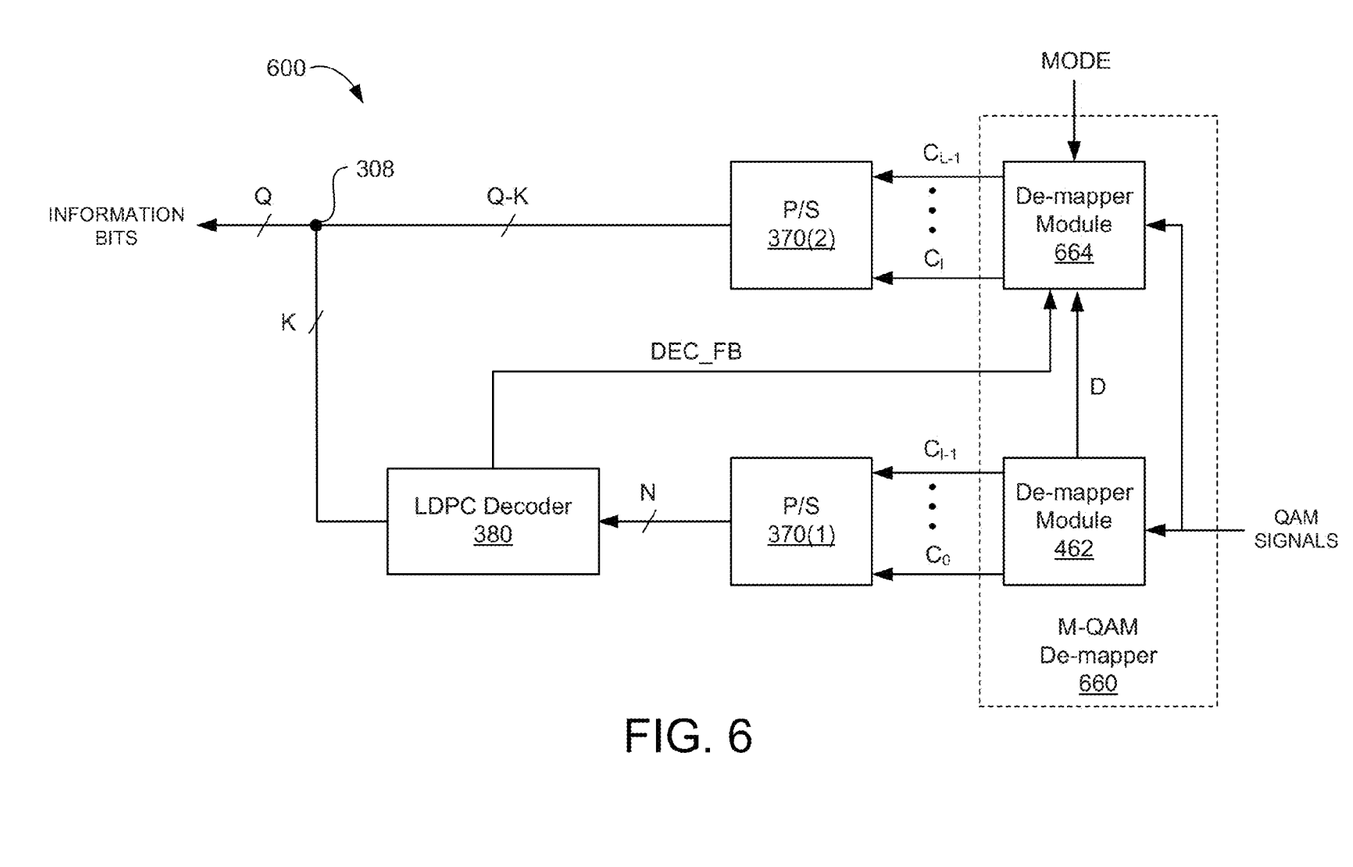
FIG. 6 illustrates a block diagram of a receiver with multi-stage QAM de-mapping circuitry, which is operable in multiple modes, in accordance with some embodiments.

FIG. 6 illustrates a block diagram of a receiver 600 with multi-stage QAM de-mapping circuitry, which is operable in multiple modes, in accordance with some embodiments. The receiver 600 includes a multi-mode M-QAM de-mapper 660, P/S modules 370(1)-370(2), and LDPC decoder 380. The M-QAM de-mapper 660 includes first de-mapper module 462 and a second de-mapper module 664, which is selectively operable in a legacy mode and/or in an enhanced mode in response to a mode select (MODE) signal. For example, when operating in the enhanced mode, the de-mapper modules 462 and 664 may perform de-mapping operations in multiple stages (e.g., as described above with respect to FIGS. 3 and 4). More specifically, in the enhanced mode, the second de-mapper module 664 generates the L-I labeling bits $C_I$-$C_{L-1}$ after receiving the DEC_FB signal from the LDPC decoder 380 and the distance values D from the first de-mapper module 462 (i.e., after the first de-mapper module 462 outputs the I labeling bits $C_0$-$C_{I-1}$).

When operating in the legacy mode, the second de-mapper module 664 may perform de-mapping operations on the received QAM signals concurrently with the first de-mapper module 462. In other words, the second de-mapper module 664 does not rely on the DEC_FB signal from the LDPC decoder 380 or the distance calculations D from the de-mapper module 462 to generate the L-I labeling bits $C_I$-$C_{L-1}$ when operating in the legacy mode. Rather, the second de-mapper module 664 may de-map the received QAM signal in substantially the same manner, and at substantially the same time, as the first de-mapper module 462 (e.g., based on the standard M-QAM constellation 500 shown in FIG. 5A).

Figure 7:
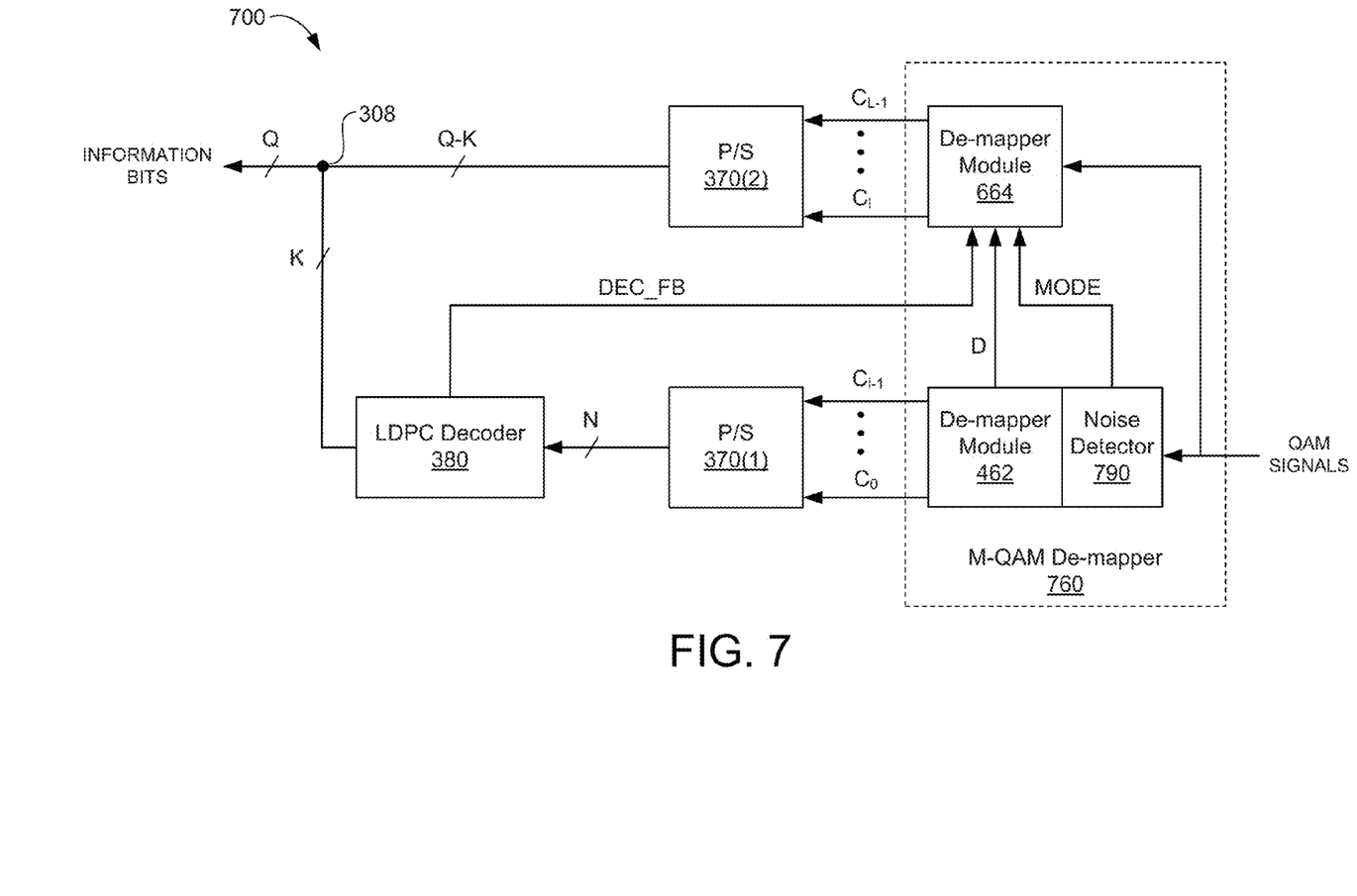
FIG. 7 illustrates a block diagram of a receiver with multi-stage QAM de-mapping circuitry, which is operable in multiple modes, in accordance with other embodiments.

FIG. 7 illustrates a block diagram of a receiver 700 with multi-stage QAM de-mapping circuitry, which is operable in multiple modes, in accordance with other embodiments. The receiver 700 includes a multi-mode M-QAM de-mapper 760, P/S modules 370(1)-370(2), and LDPC decoder 380. The M-QAM de-mapper 760 includes first and second de-mapper modules 462 and 664, respectively, and a noise detector 790. The noise detector 790 is configured to detect noise and/or signal distortions in the received QAM signals and to selectively provide the MODE signal to the second de-mapper module 664 based on the detected noise level. For example, the noise detector 790 may assert the MODE signal if the detected noise is at or above a predetermined threshold noise level, and may de-assert the MODE signal if the detected noise drops below the predetermined threshold. The noise detector 790 may perform various methods of noise detection that are well known in the art.

For some embodiments, the second de-mapper module 664 may be configured to operate in the enhanced mode when the MODE signal is asserted and in the legacy mode when the MODE signal is not asserted. This enables the receiver 700 to perform more precise de-mapping of the QAM signals when the noise level is high (e.g., and thus the tolerable margin of error is low), and to perform more efficient de-mapping of the QAM signals when the noise level is low. For example, Table 1 below summarizes the operations of the second de-mapper 664 in response to the MODE signal.

TABLE 1

| MODE | M-QAM De-mapper 664 | Channel |
|---|---|---|
| 0 (Legacy) | Conventional de-mapping | Normal |
| 1 (Enhanced) | Multistage enhanced de-mapping | Noisy |

For some embodiments, the noise detector 790 may be at least partially integrated with the first de-mapper module 462 to assist in the distance calculations performed by the first de-mapper module 462. For example, noise in the received QAM signals may affect the accuracy of the calculated distances D. Accordingly, the first de-mapper module 462 may use noise information generated by the noise detector 790 to more accurately calculate the distances D between the estimated QAM symbol and the constellation points of the M-QAM constellation (e.g., by filtering out and/or adjusting for detected noise in the received QAM symbol).

Figure 8:
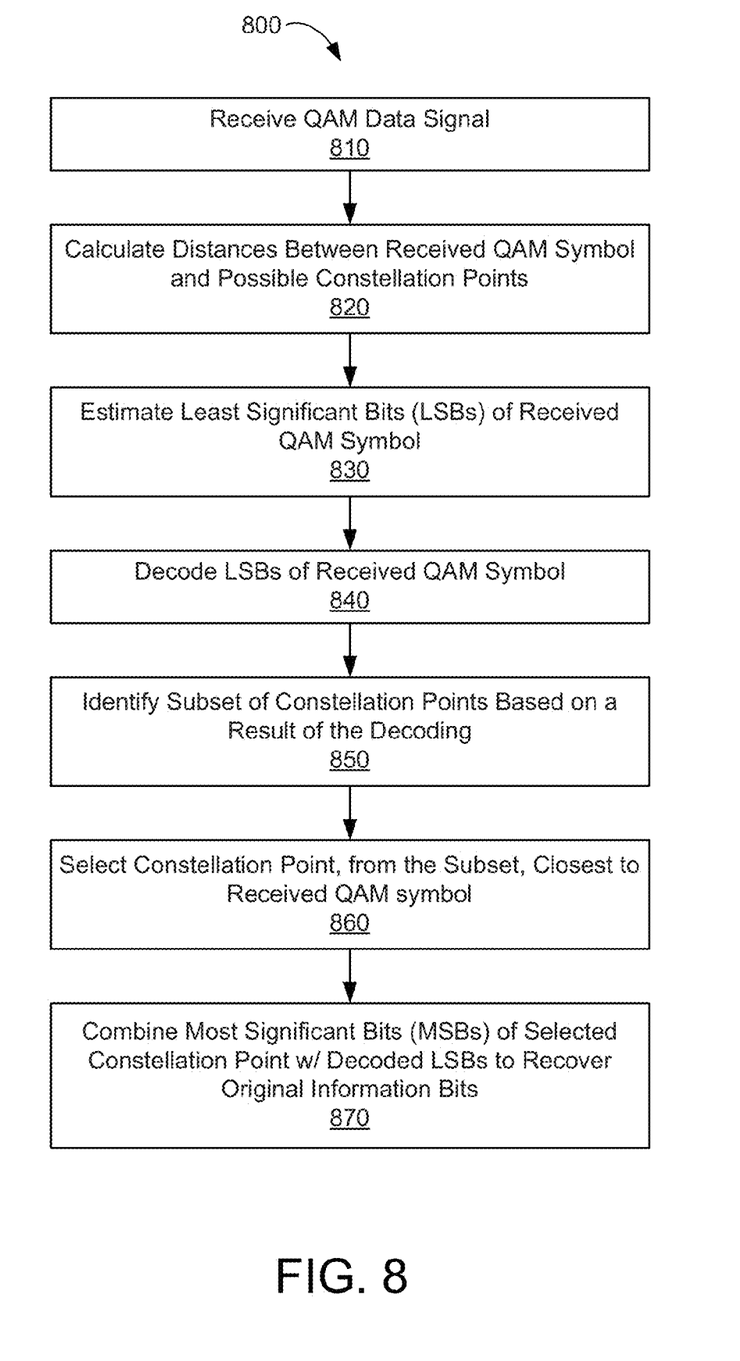
FIG. 8 is an illustrative flow chart depicting a multi-stage QAM de-mapping operation in accordance with some embodiments.

FIG. 8 is an illustrative flow chart depicting a multi-stage QAM de-mapping operation 800 in accordance with some embodiments. With reference, for example, to FIG. 3, the receiver 300 first receives a QAM data signal to be de-mapped (810). The receiver 300 then calculates distances between a received QAM symbol and a number of possible constellation points of the M-QAM constellation (820), and estimates the LSBs of the received QAM symbol (830). For example, M-QAM de-mapper 360 may estimate the LSBs based on a region of the constellation indicated by the QAM symbol information and/or one or more constellation points that have the shortest Euclidean distances to the received QAM symbol, as defined by the amplitude and phase of the QAM data signal (e.g., within a symbol period).

The receiver 300 decodes the estimated LSBs for the received QAM symbol (840) and identifies a subset of constellation points based on a result of the decoding (850). For example, the LDPC decoder 380 may perform an LDPC decoding operation on the estimated LSBs. As a result of the decoding, the LDPC decoder 380 may generate updated and/or corrected values for the LSBs. The M-QAM de-mapper 360 may thus identify the subset of constellation points that map to labeling bits having these updated LSBs. For some embodiments, the LDPC decoder 380 may process one or more sets of LSBs from the M-QAM de-mapper 360 to recover K information bits and N-K parity bits.

The receiver 300 then selects a constellation point, from the subset, that is closest to the received QAM symbol (860). For example, the distances from each constellation point in the subset to the received QAM symbol may already be known (e.g., 820). Accordingly, the M-QAM de-mapper 360 may compare the distances associated with each of the constellation points in the subset and select the constellation point with the shortest Euclidean distance.

Finally, the receiver 300 combines the MSBs of the selected constellation point with the decoded LSBs to recover the original information bits (870). For example, the M-QAM de-mapper 360 may identify the L labeling bits that map to the selected constellation point. The LSBs of the L labeling bits correspond to encoded data and the remaining MSBs of the L labeling bits are un-encoded. However, since the LSBs have already been decoded (e.g., 840), the receiver 300 may simply combine the (Q-K) un-encoded labeling bits from the selected constellation point with the (K) decoded labeling bits from the LDPC decoder 380 to recover the original Q information bits.

Figure 9:
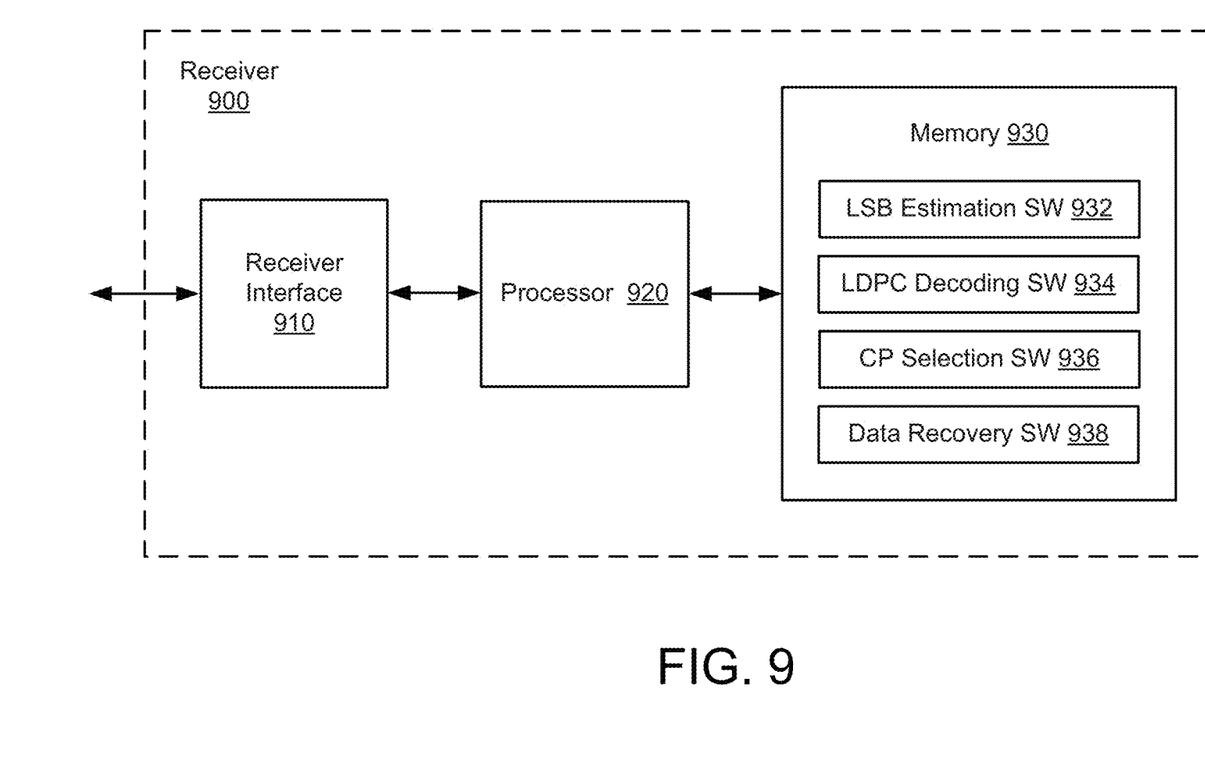
FIG. 9 is a block diagram of a receiver in accordance with some embodiments.

FIG. 9 is a block diagram of a receiver 900 in accordance with some embodiments. The receiver 900 includes a receiver interface 910, a processor 920, and memory 930. The receiver interface 910 may be used for communicating data to and/or from the receiver 900. For example, the receiver interface 910 may receive QAM data signals (e.g., from a transmitting device) to be de-mapped and/or decoded into information bits. The receiver interface 910 may also output the information bits recovered by the receiver 900 (e.g., to a CPU) for further processing.

The memory 930 may include a non-transitory computer-readable storage medium (e.g., one or more nonvolatile memory elements, such as EPROM, EEPROM, Flash memory, a hard drive, etc.) that can store the following software modules:

LSB estimation software 932 to estimate the LSBs of a received QAM symbol;
LDPC decoding software 934 to perform LDPC decoding on a subset of labeling bits associated with the estimated constellation point;
CP selection software 936 to select a constellation point based on a result of the LDPC decoding; and
data recovery software 938 to produce a set of information bits that correspond to the received QAM symbol.

Each software module may include instructions that, when executed by the processor 920, may cause the receiver 900 to perform the corresponding function. Thus, the non-transitory computer-readable storage medium of memory 930 may include instructions for performing all or a portion of the operations described above with respect to FIG. 8.

The processor 920, which is coupled between the receiver interface 910 and the memory 930, may be any suitable processor capable of executing scripts or instructions of one or more software programs stored in the receiver 900 (e.g., within memory 930). For example, the processor 920 can execute the LSB estimation software 932, the LDPC decoding software 934, the CP selection software 936, and/or the data recovery software 938.

The LSB estimation software 932 may be executed by the processor 920 to estimate the LSBs of a received QAM symbol. For example, the LSB estimation software 932, as executed by the processor 920, may calculate the Euclidean distances between the QAM symbol (e.g., based on the amplitude and phase of the received QAM data signal) and a number of possible constellation points of an M-QAM constellation. For some embodiments, the processor 920 may estimate the LSBs of the received QAM symbol based on a region of the constellation indicated by the QAM symbol information and/or one or more constellation points having the shortest distance to the received QAM symbol.

The LDPC decoding software 934 may be executed by the processor 920 to perform LDPC decoding on the estimated LSBs of the received QAM symbol. For example, the LDPC decoding software 934, as executed by the processor 920, may perform LDPC decoding on the estimated LSBs. The decoded LSBs may correspond to a subset of the original information bits. The processor 920, in executing the LDPC decoding software 934, may further generate updated and/or corrected values for the LSBs. For some embodiments, the processor 920, in executing the LDPC decoding software 934, may process one or more sets of LSBs to recover a subset of information bits and parity bits.

The CP selection software 936, as executed by the processor 920, may select a constellation point from the M-QAM constellation based on a result of the LDPC decoding. For example, in executing the CP selection software 936, the processor 920 may identify a subset of constellation points (of the M possible constellation points) that map to labeling bits having the updated LSBs generated by the LDPC decoding software 934. The processor 920 may then select one of the constellation points from the subset that is closest to the received QAM symbol (e.g., based on the distances calculated by the LSB estimation software 932).

The data recovery software 938 may be executed by the processor 920 to produce a set of information bits that correspond to the received QAM symbol. For example, the processor 920, in executing the data recovery software 938, may identify the labeling bits that map to the constellation point selected by the CP selection software 936. The processor 920 may then combine the MSBs of the identified labeling bits with the decoded LSBs generated by the LDPC decoding software 934 to recover the original information bits.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, the method steps depicted in the flow chart of FIG. 8 may be performed in other suitable orders, multiple steps may be combined into a single step, and/or some steps may be omitted.

What is claimed is:

1. A receiver circuit to receive a quadrature amplitude modulation (QAM) data signal, the receiver circuit comprising:
   a first de-mapper circuit to recover a set of encoded data bits from the QAM data signal by calculating a plurality of distances between a received QAM symbol and each of a plurality of possible constellation points;
   a decoder circuit to decode the set of encoded data bits recovered by the first de-mapper circuit; and
   a second de-mapper circuit to generate a set of un-encoded data bits for the received QAM symbol based, at least in part, on a result of the decoding and the plurality of distances calculated by the first de-mapper circuit, wherein the second de-mapper circuit is selectively operable in a first mode or a second mode, and wherein:
      when operating in the first mode, the second de-mapper circuit is to recover the set of un-encoded data bits concurrently with the first de-mapper circuit recovering the set of encoded data bits; and
      when operating in the second mode, the second de-mapper circuit is to generate the set of un-encoded data bits after receiving the information about the plurality of distances calculated by the first de-mapper circuit and the result of the decoding.

2. The receiver circuit of claim 1, wherein the set of encoded data bits corresponds to a low density parity check (LDPC) code word, and wherein the result of the decoding includes a set of information bits and a set of parity bits.

3. The receiver circuit of claim 2, wherein the set of information bits and the set of parity bits represent least significant bits (LSBs) of the received QAM symbol.

4. The receiver circuit of claim 3, wherein the second de-mapper circuit is to identify a subset of the plurality of possible constellation points that include the LSBs.

5. The receiver circuit of claim 4, wherein the second de-mapper circuit is to generate the set of un-encoded data bits by selecting, from the subset of possible constellation points, a constellation point that is associated with a shortest distance of the plurality of distances.

6. The receiver circuit of claim 5, wherein the set of un-encoded data bits corresponds to a set of most significant bits (MSBs) of the selected constellation point.

7. The receiver circuit of claim 1, further comprising:
   a noise detector to detect noise in the QAM data signal and to select either the first mode or the second mode based on the detected noise.

8. The receiver circuit of claim 7, wherein the noise detector selects the second mode if the detected noise is above a first threshold level.

9. A method of de-mapping a quadrature amplitude modulation (QAM) data signal, the method comprising:
   recovering a set of encoded data bits from the QAM data signal by calculating a plurality of distances between a received QAM symbol and each of a plurality of possible constellation points;
   detecting noise in the QAM data signal; and
   generating a set of un-encoded data bits for the received QAM symbol based, at least in part, on the plurality of distances when the detected noise is above a threshold level.

10. The method of claim 9, wherein generating the set of un-encoded data bits comprises:
    decoding the set of encoded data bits; and
    generating the set of un-encoded data bits based on a result of the decoding and the plurality of distances.

11. The method of claim 10, wherein the set of encoded data bits corresponds to a low density parity check code word, and wherein the result of the decoding includes a set of information bits and a set of parity bits.

12. The method of claim 11, wherein the set of information bits and the set of parity bits represent least significant bits (LSBs) of the received QAM symbol.

13. The method of claim 12, further comprising:
    identifying a subset of the plurality of possible constellation points that include the LSBs.

14. The method of claim 13, wherein generating the set of un-encoded data bits includes selecting, from the subset of possible constellation points, a constellation point that is associated with a shortest distance of the plurality of distances.

15. The method of claim 14, wherein the set of un-encoded data bits corresponds to a set of most significant bits (MSBs) of the selected constellation point.

16. A non-transitory computer-readable storage medium containing program instructions that, when executed by a processor provided within a communications device, causes the device to:
- receive a quadrature amplitude modulation (QAM) data signal;
- recover a set of encoded data bits from the QAM data signal by calculating a plurality of distances between a received QAM symbol and each of a plurality of possible constellation points;
- detect noise in the QAM data signal; and
- generate a set of un-encoded data bits for the received QAM symbol based, at least in part, on the plurality of distances when the detected noise is above a threshold level.

17. The non-transitory computer-readable storage medium of claim 16, wherein execution of the program instructions to generate the set of un-encoded data bits causes the device to:
- decode the set of encoded data bits; and
- generate the set of un-encoded data bits based on a result of the decoding and the plurality of distances.

18. The non-transitory computer-readable storage medium of claim 17, wherein the set of encoded data bits corresponds to a low density parity check code word, and wherein the result of the decoding includes a set of information bits and a set of parity bits.

19. The non-transitory computer-readable storage medium of claim 18, wherein the set of information bits and the set of parity bits represent least significant bits of the received QAM symbol.

20. The non-transitory computer-readable storage medium of claim 19, further comprising program instructions that cause the device to:
- identify a subset of the plurality of possible constellation points that include the LSBs.

21. The non-transitory computer-readable storage medium of claim 20, wherein execution of the program instructions to generate the set of un-encoded data bits causes the device to:
- select, from the subset of possible constellation points, a constellation point that is associated with a shortest distance of the plurality of distances.

22. The non-transitory computer-readable storage medium of claim 21, wherein the set of un-encoded data bits corresponds to a set of most significant bits of the selected constellation point.

23. A receiver circuit to receive a quadrature amplitude modulation (QAM) data signal, the receiver circuit comprising:
- means for recovering a set of encoded data bits from the QAM data signal by calculating a plurality of distances between a received QAM symbol and each of a plurality of possible constellation points;
- means for detecting noise in the QAM data signal; and
- means for generating a set of un-encoded data bits for the received QAM symbol based, at least in part, on the plurality of distances when the detected noise is above a threshold level.

24. The receiver circuit of claim 23, wherein the means for generating the set of un-encoded data bits is to:
- decode the set of encoded data bits; and
- generate the set of un-encoded data bits based on a result of the decoding and the plurality of distances.

25. The receiver circuit of claim 24, wherein the set of encoded data bits corresponds to a low density parity check code word, and wherein the result of the decoding includes a set of information bits and a set of parity bits.

26. The receiver circuit of claim 25, wherein the set of information bits and the set of parity bits represent least significant bits of the received QAM symbol.

27. The receiver circuit of claim 26, further comprising:
- means for identifying a subset of the plurality of possible constellation points that include the LSBs.

28. The receiver circuit of claim 27, wherein the means for generating the set of un-encoded data bits is to:
- select, from the subset of possible constellation points, a constellation point that is associated with a shortest distance of the plurality of distances.

29. The receiver circuit of claim 28, wherein the set of un-encoded data bits corresponds to a set of most significant bits of the selected constellation point.

* * * * *